United States Patent
Kwatra et al.

(10) Patent No.: US 11,410,103 B2
(45) Date of Patent: Aug. 9, 2022

(54) COGNITIVE RIDE SCHEDULING

(71) Applicant: INTERNATIONAL BUSINESS MACHINES CORPORATION, Armonk, NY (US)

(72) Inventors: Shikhar Kwatra, Morrisville, NC (US); Paul Krystek, Highland, NY (US); Komminist Weldemariam, Nairobi (KE); Blaise Schaeffer, Durham, NC (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 190 days.

(21) Appl. No.: 15/832,944

(22) Filed: Dec. 6, 2017

(65) Prior Publication Data

US 2019/0171988 A1 Jun. 6, 2019

(51) Int. Cl.
*G06Q 10/06* (2012.01)
*G06Q 50/30* (2012.01)
*G06N 20/00* (2019.01)

(52) U.S. Cl.
CPC ....... *G06Q 10/06314* (2013.01); *G06N 20/00* (2019.01); *G06Q 10/067* (2013.01); *G06Q 50/30* (2013.01)

(58) Field of Classification Search
CPC .............. G06N 20/00; G06Q 10/067; G06Q 10/063116; G06Q 50/30; G06Q 10/025
See application file for complete search history.

(56) References Cited

U.S. PATENT DOCUMENTS

| | | | |
|---|---|---|---|
| 9,230,292 B2 | 1/2016 | Amin et al. | |
| 10,248,913 B1* | 4/2019 | Gururajan | G06Q 50/30 |
| 2014/0040166 A1* | 2/2014 | Handley | G06Q 10/06 |
| | | | 706/11 |
| 2014/0095234 A1* | 4/2014 | Johnson | G06Q 10/10 |
| | | | 705/7.12 |
| 2015/0019462 A1* | 1/2015 | De | G06N 5/022 |
| | | | 706/11 |
| 2015/0081362 A1 | 3/2015 | Chadwick et al. | |
| 2016/0026936 A1 | 1/2016 | Richardson et al. | |
| 2016/0055605 A1 | 2/2016 | Kim et al. | |
| 2016/0320198 A1 | 11/2016 | Liu et al. | |
| 2016/0321771 A1* | 11/2016 | Liu | G06Q 30/0613 |
| 2017/0024393 A1 | 1/2017 | Choksi et al. | |
| 2017/0038948 A1 | 2/2017 | Cun et al. | |

(Continued)

OTHER PUBLICATIONS

"Scheduling Resources in Multi-User, Heterogeneous, Computing Environments with SmartNet", by Freund et al., Proceedings Seventh Heterogeneous computing Workshop, Mar. 30, 1998. (Year: 1998).*

(Continued)

*Primary Examiner* — Pan G Choy
(74) *Attorney, Agent, or Firm* — Griffiths & Seaton PLLC

(57) ABSTRACT

Embodiments for facilitating ride scheduling by a processor. An occurrence of an event associated with a user may be predicted based on user data. One or more ride scheduling parameters relating to the event may be determined. One or more ride scheduling models may be determined satisfying the ride scheduling parameters. Facilitate scheduling a vehicle for the user according to the ride scheduling models.

17 Claims, 7 Drawing Sheets

(56) References Cited

U.S. PATENT DOCUMENTS

| | | | |
|---|---|---|---|
| 2017/0126837 A1 | 5/2017 | Wang et al. | |
| 2017/0169366 A1* | 6/2017 | Klein | G06Q 50/30 |
| 2017/0200321 A1* | 7/2017 | Hummel | G06Q 30/0609 |
| 2017/0372268 A1* | 12/2017 | Ilan | G06N 20/00 |
| 2018/0174089 A1* | 6/2018 | Tulabandhula | G06Q 10/06393 |
| 2018/0211348 A1* | 7/2018 | Narayan | G06Q 50/30 |
| 2018/0306609 A1* | 10/2018 | Agarwal | H04L 67/12 |

OTHER PUBLICATIONS

"Smart Ride Share with Flexible Route Matching", by Chung-Min Chen, David Shallcross, Yung-Chien Shih, Yen-Ching Wu, Sheng-Po Kuo, Yuan-Ying Hsu, Yuhsiang Holderby, and William Chou. 13th International Conference on Advanced Communication Technology Feb. 13-16, 2011. (Year: 2011).*

"Predicting Irregularities in Arrival Times for Toronto Transit Buses with LSTM Recurrent Neural Networks Using Vehicle Locations and Weather Data", by Anshuman Kush, Trent University, Peterborough, Ontario, Canada, May 2019. (Year: 2019).*

"A partition-Based Dynamic Routing Algorithm for On-Demand Bus Scheduling in Rural Areas", by Kochumman Geevarghese, School of Computer Science and Information Systems, Pace University, May 2016. (Year: 2016).*

* cited by examiner

COGNITIVE RIDE SCHEDULING

BACKGROUND OF THE INVENTION

Field of the Invention

The present invention relates in general to computing systems, and more particularly to, various embodiments for facilitating ride scheduling by a processor.

Description of the Related Art

In today's society, consumers, business persons, educators, and others use various computing network systems with increasing frequency in a variety of settings. The advent of computers and networking technologies have made possible the increase in the quality of life while enhancing day-to-day activities. Computing systems can include an Internet of Things (IoT), which is the interconnection of computing devices scattered across the globe using the existing Internet infrastructure. IoT devices may be embedded in a variety of physical devices or products.

As great strides and advances in technologies come to fruition, the greater the need to make progress in these systems advantageous for efficiency and improvement such as, for example, for using the vast amount of available data for facilitating travel arrangements.

SUMMARY OF THE INVENTION

Various embodiments for facilitating ride scheduling by a processor, are provided. In one embodiment, by way of example only, a method for facilitating ride scheduling based on scheduling parameters and user preferences by a processor is provided. An occurrence of an event associated with a user may be predicted based on user data. One or more ride scheduling parameters relating to the event may be determined. One or more ride scheduling models may be determined satisfying the ride scheduling parameters. A vehicle may be scheduled for the user according to the ride scheduling models.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which.

DETAILED DESCRIPTION OF THE DRAWINGS

Figure 1:
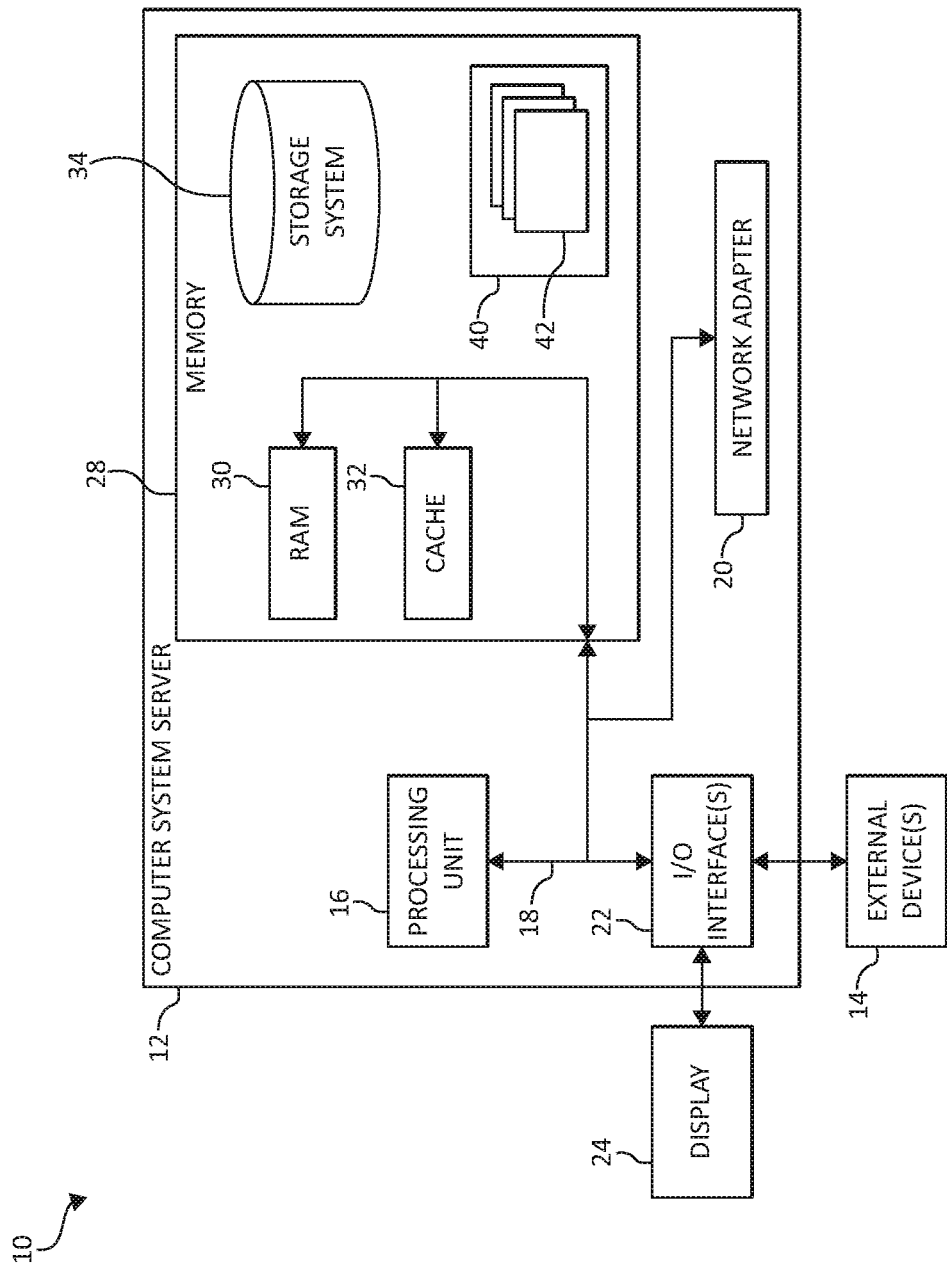
FIG. 1 is a block diagram depicting an exemplary computing node according to an embodiment of the present invention.

Computing systems may include large scale computing called "cloud computing," in which resources may interact and/or be accessed via a communications system, such as a computer network. Resources may be software-rendered simulations and/or emulations of computing devices, storage devices, applications, and/or other computer-related devices and/or services run on one or more computing devices, such as a server. For example, a plurality of servers may communicate and/or share information that may expand and/or contract across servers depending on an amount of processing power, storage space, and/or other computing resources needed to accomplish requested tasks. The word "cloud" alludes to the cloud-shaped appearance of a diagram of interconnectivity between computing devices, computer networks, and/or other computer related devices that interact in such an arrangement.

Additionally, the Internet of Things (IoT) is an emerging concept of computing devices that may be embedded in objects, especially appliances, and connected through a network. An IoT network may include one or more IoT devices or "smart devices", which are physical objects such as appliances with computing devices embedded therein. Many of these objects are devices that are independently operable, but they may also be paired with a control system or alternatively a distributed control system such as one running over a cloud computing environment.

The prolific increase in use of IoT appliances in computing systems, particularly within the cloud computing environment, in a variety of settings provide various beneficial uses to a user. Various IoT appliances may be used for personal use, such as travel or exercise, while also using the IoT appliances within various types of vehicles or navigation systems for travel. For example, many individuals arrange for travel using taxis or other ride sharing services for commuting from one place to another. Accordingly, one or more IoT devices may be used to inform a user or vehicle of any incidents which may affect travel time/travel safety/travel comfort on a journey and/or be used to assist with travel planning. Such information may be provided to a user during navigation along a route via an in-car navigation device, such as a personal navigation device (PND) or integrated device, or may be provided as an input to an Advanced Driver Assistance System (ADAS). However, current systems fail to provide cognitive analysis of user preferences, ride sharing parameters, and traffic conditions.

Accordingly, the present invention provides for an intelligent, cognitive system that facilitates ride scheduling based on traffic, surcharge, user preferences, and characteristics and services of the transport service (e.g., the vehicle) relating to the safety, comfort, and efficiency of ride sharing. In one aspect, the present invention may determine a selected time a user intends/desires to leave or depart, a destination, traffic conditions, surcharges that may be required, and whether a user prefers or does not prefer to engage in ride sharing. One or more ride sharing parameters/factors may be learned and/or determined based on needs, preferences, job types, and/or behavior patterns of a user. In an additional aspect, a cognitive interaction operation may be used wherein one or more computing devices (e.g., a smartphone, an in-car navigation system, wearable IoT device) engages in a communication dialog to ask one or more questions such as, for example, user preferences on the types, methods, preferences, and ways of being driven. For example, the cognitive interaction operation may ask "how do you prefer the temperature/inside the vehicle?," "do you prefer the air conditioner on low, medium, or high speed?," "are there any specific radio channels you prefer (e.g., a favorite music station or talk radio program)?" or other types of questions. In one aspect, the cognitive ride scheduling system learns the activities of daily living (ADL), behavior patterns and routines of the user, traveling routines, user preferences, and/or context data relating to ride sharing scheduling. In further embodiments, various characteristics pertaining to a vehicle (including autonomous or self-driven vehicle) such as size of the vehicle, comfort-level of the vehicle, historical rating of the vehicle, etc. may be learned such as, for example, learning user-preferred vehicle characteristics for arranging travel. In this way, the present invention reduces and/or eliminates repetitive processes involved in arranging travel (e.g., explaining to a taxi driver the same information about where the user needs to travel each day such as, for example, commuting to work).

Thus, various embodiments are provided herein for facilitating ride scheduling based on scheduling parameters and user preferences. An occurrence of an event associated with a user may be predicted based on user data. One or more ride scheduling parameters relating to the event may be determined. One or more ride scheduling models may be determined satisfying the ride scheduling parameters.

In an additional aspect, various embodiments are provided herein for enabling cognitive ride sharing se s among a single entity or a group of users/commuters. A computing device may include a processor and an interface for connecting the client device with a server (capable of executing a cognitive ride scheduling service) capable of: monitoring the daily activity of the user via a smart device and/or a plurality of communicating devices including the applications used by the user for booking the ride, estimating the departure time, determining a location of the user, and retrieving updates on social events pertaining to the destination from the smart device (e.g., traffic, accidents, estimated time, alternate routes, etc.). The transportation service may perform the ride booking via a most suitable application.

The cognitive ride scheduling service may execute commands to and/or from a smart device to communicate with other devices if the user is sharing the ride based on the established pattern history. The cognitive ride scheduling service enables the storing of the user's pattern via wearable devices (e.g., smartwatch for detecting sleep and/or sleep routines and patterns), video monitoring units (observing the state of the user and studying the routine) and other content/context determinations (e.g., Mel Frequency Cepstral Coefficients (MFCC) for feature extraction for monitoring communications with/without other shared users) for estimating the departure time.

The cognitive ride scheduling service may facilitate instructions to enable ride sharing based on the time range for safe departure (e.g., no problems occur if a user reaches the destination 5 min early and the user is able to avoid traffic and additional expenses) and the surcharge on the ride booking applications used by the user. Also, the cognitive ride scheduling service may book or schedule one or more alternate ride sharing services based on additional expenses (application surcharge at a point of time), user's coupons, discounts, and/or other preferences, constraints, or ride sharing parameters.

In one aspect, the present invention arranges a transport service for a user based on estimated user preferences (e.g., user preference to be driven and/or a preference to share a ride to reduce costs, increase comfort and safety, etc.) from one or more data sources. One or more means of transportation (e.g., a vehicle) may be determined based on the estimated user preferences (e.g., a preference to be driven by a transport service). One or more of the means of transportation may be triggered to schedule (e.g., "book") a ride service according to the estimated user preferences. That is, each of the means of transportation may be ranked according to the estimated user preferences. The ranking may include assigning a value, a percentage, or ranges of values. For example, a first vehicle may be assigned a value of 1 (e.g., 1-10 being a range of available values with 1 being representative of a vehicle service having the greatest amount/number of characteristics that match the user preferences and 10 being representative of a vehicle service having the least amount/number of characteristics that match the user preferences or vice versa).

In an additional aspect, the present invention may learn a cognitive pattern of the user related to scheduling a transport service (e.g., a taxi cab) at a specific time and monitoring the activity of the user while scheduling the ride in order to establish the confidence level. The learning may include one or more ride scheduling parameters. One or more booking selection factors may be determined at least based on historical scheduling parameters and the confidence level. Once the booking selection factors have been set, the ride sharing service may include using one or more parameters including: (a) a user's sleeping pattern; (b) the user's daily routine of scheduling/booking the transport service to a specified location; (c) current traffic conditions relating to one or more routes to reach a daily destination; (d) road hazards and/or accidents along the route (e.g., a destined route); (e) a user's calendar; (f) one or more scheduled meetings or appointments of the calendar of the user; (g) an estimated departure time of the user; (h) a surcharge (e.g., fare, fee, tax, etc.) at a particular point of time, and/or other defined or selected parameters. A computing device (e.g., phone, tablet, iPad, smartwatch, etc.) of the user may be enabled to schedule/book a vehicle for the user (considering all the above-stated parameters in order to make the best decision for the user).

In one aspect, the mechanisms of the present invention learn a series of driver parameters based on: (1) detecting sensor data from one or more sensors relating to vehicle dynamics and relative vehicle dynamics; (2) receiving vehicular collaboration data received from other vehicles via "vehicle-to-vehicle" ('V2V') communication and/or considering other car-external data sources (e.g. drones, moving cameras); (3) learning ride sharing model parameters and indicators (e.g., user preferences, preference to share a transport service, preference to be an exclusive passenger of a transport service, context of the user, constraints relating to the scheduling of the transport service, etc.); (4) scheduled or documented events included in a calendar of a user (e.g., an electronic calendaring system accessible via a computing device); and/or (5) preferred characteristics and services of the transport service relating to the safety, comfort, and efficiency of ride sharing.

In one aspect, specific parameters or "contextual factors" may be dynamically learned via one or more machine learning operations such as, for example, Kalman filters, particle filtering techniques, and MCMC (Monte Carlo Markov Chain) techniques. Furthermore, contextual factors may be in a specific context related to scheduling a transport service (e.g., a ride sharing service). The contextual factors may include, for example, traffic data, weather data, road conditions, a health state of the operator, biometric data of the user, time constraints of the user relating to an event (scheduled or learned), one or more alternative users using the one or more modes of transportation relating to the more ride scheduling models, risk levels of the more ride scheduling models, or a combination thereof. Thus, the learned ride sharing parameters of the user may be used to analyze, monitor, and/or schedule one or more ride sharing services.

The so-called "journey" may be very subjective and context dependent. A journey may simply be, in a broadest possible meaning, the entire/whole travel experience from a point A to a point B. For example, a journey may encompass an entire travel experience for a user (e.g., commuting from home to work). In a more limiting context, a journey may include one or more actions or movements of traveling from one location to another location. The journey may also include one or more acts, events, decisions, or travel related operations relating to one or more acts of moving from one location to one or more alternative locations. A journey may include each decision, experience, action, and/or movement within and without a vehicle. A journey may include one or more routes and destinations. A journey may also include one or more actions, movements, stops (temporary or permanent), travel information, reservations, transportation options, modes of travel, and/or one or more operations relating to navigation systems, entertainment systems, and/or telecommunication systems.

It should be noted as described herein, the term "cognitive" (or "cognition") may be relating to, being, or involving conscious intellectual activity such as, for example, thinking, reasoning, or remembering, that may be performed using a machine learning. In an additional aspect, cognitive or "cognition" may be the mental process of knowing, including aspects such as awareness, perception, reasoning and judgment. A machine learning system may use artificial reasoning to interpret data from one or more data sources (e.g., sensor based devices or other computing systems) and learn topics, concepts, and/or processes that may be determined and/or derived by machine learning.

In an additional aspect, cognitive or "cognition" may refer to a mental action or process of acquiring knowledge and understanding through thought, experience, and one or more senses using machine learning (which may include using sensor based devices or other computing systems that include audio or video devices). Cognitive may also refer to identifying patterns of behavior, leading to a "learning" of one or more events, operations, or processes. Thus, the cognitive model may, over time, develop semantic labels to apply to observed behavior and use a knowledge domain or ontology to store the learned observed behavior. In one embodiment, the system provides for progressive levels of complexity in what may be learned from the one or more events, operations, or processes.

In additional aspect, the term cognitive may refer to a cognitive system. The cognitive system may be a specialized computer system, or set of computer systems, configured with hardware and/or software logic (in combination with hardware logic upon which the software executes) to emulate human cognitive functions. These cognitive systems apply human-like characteristics to convey and manipulate ideas which, when combined with the inherent strengths of digital computing, can solve problems with a high degree of accuracy (e.g., within a defined percentage range or above an accuracy threshold) and resilience on a large scale. A cognitive system may perform one or more computer-implemented cognitive operations that approximate a human thought process while enabling a user or a computing system to interact in a more natural manner. A cognitive system may comprise artificial intelligence logic, such as natural language processing (NLP) based logic, for example, and machine learning logic, which may be provided as specialized hardware, software executed on hardware, or any combination of specialized hardware and software executed on hardware. The logic of the cognitive system may implement the cognitive operation(s), examples of which include, but are not limited to, question answering, identification of related concepts within different portions of content in a corpus, and intelligent search algorithms, such as Internet web page searches.

In general, such cognitive systems are able to perform the following functions: 1) Navigate the complexities of human language and understanding; 2) Ingest and process vast amounts of structured and unstructured data; 3) Generate and evaluate hypotheses; 4) Weigh and evaluate responses that are based only on relevant evidence; 5) Provide situation-specific advice, insights, estimations, determinations, evaluations, calculations, and guidance; 6) Improve knowledge and learn with each iteration and interaction through machine learning processes; 7) Enable decision making at the point of impact (contextual guidance); 8) Scale in proportion to a task, process, or operation; 9) Extend and magnify human expertise and cognition; 10) Identify resonating, human-like attributes and traits from natural language; 11) Deduce various language specific or agnostic attributes from natural language; 12) Memorize and recall relevant data points (images, text, voice) (e.g., a high degree of relevant recollection from data points (images, text, voice) (memorization and recall)); and/or 13) Predict and sense with situational awareness operations that mimic human cognition based on experiences.

Additional aspects of the present invention and attendant benefits will be further described, following.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security parameters, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, system memory 28 may include at least one program product having a set (e.g., at least one) of program modules that are configured to carry out the functions of embodiments of the invention.

Program/utility 40, having a set (at least one) of program modules 42, may be stored in system memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

In the context of the present invention, and as one of skill in the art will appreciate, various components depicted in FIG. 1 may be located in a moving vehicle. For example, some of the processing and data storage capabilities associated with mechanisms of the illustrated embodiments may take place locally via local processing components, while the same components are connected via a network to remotely located, distributed computing data processing and storage components to accomplish various purposes of the present invention. Again, as will be appreciated by one of ordinary skill in the art, the present illustration is intended to convey only a subset of what may be an entire connected network of distributed computing components that accomplish various inventive aspects collectively.

Figure 2:
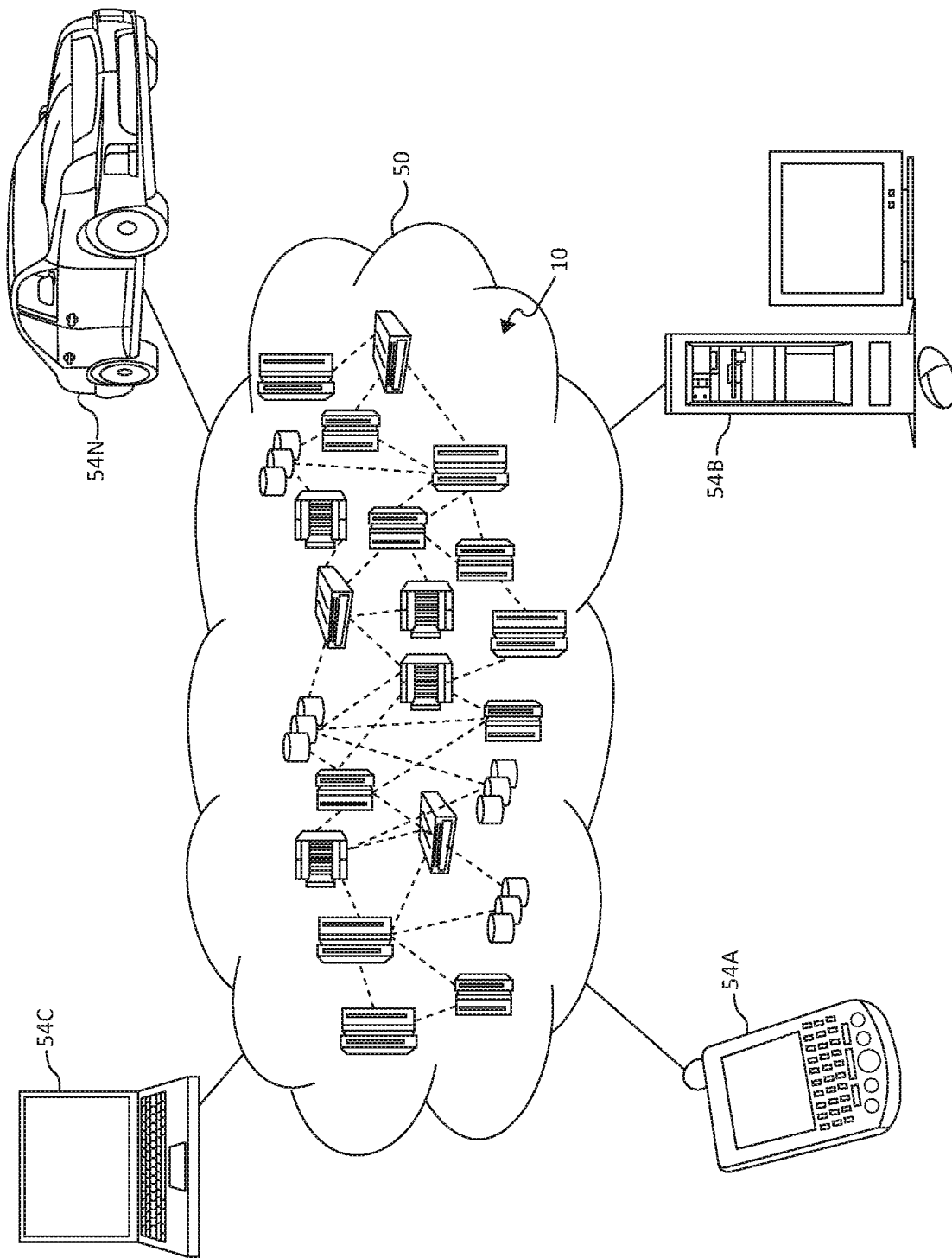
FIG. 2 is an additional block diagram depicting an exemplary cloud computing environment according to an embodiment of the present invention.

Referring now to FIG. 2, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
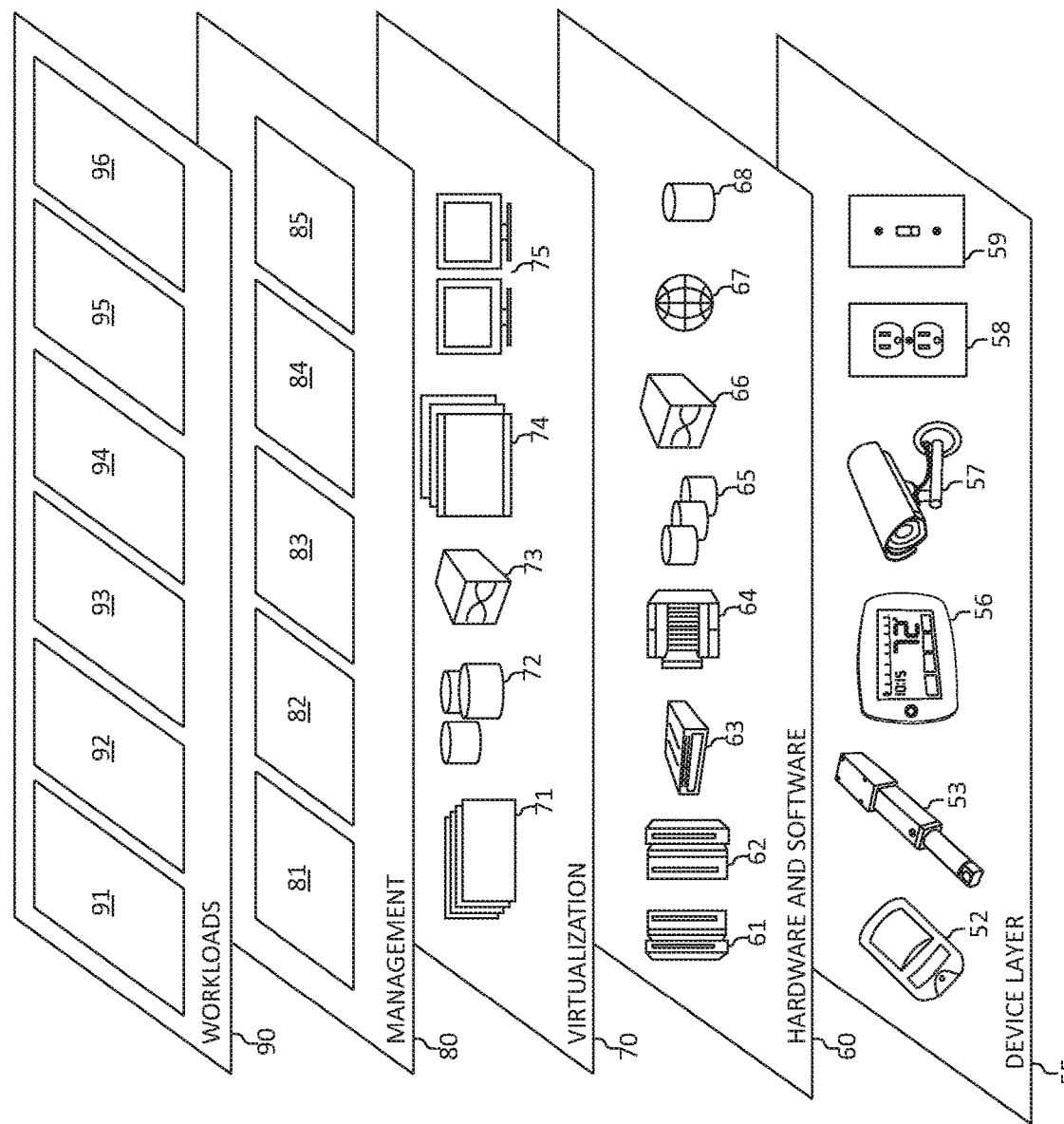
FIG. 3 is an additional block diagram depicting abstraction model layers according to an embodiment of the present invention.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Device layer 55 includes physical and/or virtual devices, embedded with and/or standalone electronics, sensors, actuators, and other objects to perform various tasks in a cloud computing environment 50. Each of the devices in the device layer 55 incorporates networking capability to other functional abstraction layers such that information obtained from the devices may be provided thereto, and/or information from the other abstraction layers may be provided to the devices. In one embodiment, the various devices inclusive of the device layer 55 may incorporate a network of entities collectively known as the "internet of things" (IoT). Such a network of entities allows for intercommunication, collection, and dissemination of data to accomplish a great variety of purposes, as one of ordinary skill in the art will appreciate.

Device layer 55 as shown includes sensor 52, actuator 53, "learning" thermostat 56 with integrated processing, sensor, and networking electronics, camera 57, controllable household outlet/receptacle 58, and controllable electrical switch 59 as shown. Other possible devices may include, but are not limited to various additional sensor devices, networking devices, electronics devices (such as a remote control device), additional actuator devices, so called "smart" appliances such as a refrigerator or washer/dryer, and a wide variety of other possible interconnected objects.

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provides cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provides pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and, in the context of the illustrated embodiments of the present invention, various cognitive ride scheduling workloads and functions 96. In addition, cognitive ride scheduling workloads and functions 96 may include such operations as data analysis (including data collection and processing from various vehicular or environmental sensors), collaborative data analysis, and predictive data analytics functions. One of ordinary skill in the art will appreciate that the cognitive ride scheduling workloads and functions 96 may also work in conjunction with other portions of the various abstractions layers, such as those in hardware and software 60, virtualization 70, management 80, and other workloads 90 (such as data analytics processing 94, for example) to accomplish the various purposes of the illustrated embodiments of the present invention.

As previously mentioned, the mechanisms of the illustrated embodiments provide novel approaches for cognitive ride scheduling of a transport service. In one aspect, one or more activities of a user (e.g., sleeping patterns, work routines, eating schedules, etc.) may be tracked and monitored to learn the activities of daily living ("ADL"). For example, an IoT device (e.g., an IoT device such as a watch, smartphone, tablet, etc.) may monitor activities, alerts/alarms, calendar information, schedules, and/or other defined actions of the user to determine a time the user wakes up, leaves to and/or from work, arrives at work, or other activities.

As an additional illustration, consider the following example. A mobile device (which may be a wearable IoT device) may monitor and track a user's sleeping pattern in order to monitor the daily routine or the time user gets up in the morning particularly since the user may snooze an alarm and may have a tendency to get up at a different time than the scheduled. The mobile device may track and monitor the activity of the user related to an amount of time the user takes to get ready to leave for the office. The mobile device may learn, monitor, track, and/or collect the one or more ride scheduling parameters when the user is scheduling/booking a ride. That is, a machine learning operation may (a) learn and/or track a selected application a user uses to schedule/book a ride using a transport service (e.g., a ride sharing service such as a cab); (b) learn and/or track a time at which the user is booking the ride (e.g., the time scheduled to be picked up); (c) learn and/or track the amount of time to reach a destined location; (d) learn and/or track if the user is sharing the transportation service (e.g., a cab) or exclusively using the transportation service; (e) learn and/or track a preferred amount and moment when the user schedules/books the transportation service while also learning and/or tracking the surcharge variations of each transportation service; (f) learn and/or track scheduled meetings displayed or scheduled in a calendar of the user; (g) learn and/or track weather, road hazards, repairs, traffic conditions, and/or accidents along a route/journey to a selected destination, and/or other defined or selected ride scheduling parameters.

Based on monitoring the above ride scheduling parameters and monitoring the user's activities, a confidence level may be established for scheduling/booking a most suitable ride (as compared to rides least suitable) for the user. For example, a sport utility vehicle ("SUV") with 3 rows of seating, all wheel drive for bad weather conditions (e.g., snow or rain), and leather seating may be a "most suitable" vehicle for the user on a business trip in a location known for hazardous, weather conditions during the winter months as compared to a small, compact car. That is, most or least "suitable" may be learned according to the ride scheduling parameters and monitoring the user's activities, preferences, historical patterns, activities of daily living, and/or the confidence level. Establishing the confidence level may also include analyzing and considering a preferred price by comparing and/or monitoring multiple applications the user may use and/or has used to schedule/book a transportation service. The user computing device (e.g., mobile phone, smartphone, smart watch, etc.) may monitor and track the surcharge in each of the applications associated with each transportation service. The user computing device may monitor and track the traffic and accidents and estimate an optimal time interval or range of time (e.g., according to the learned parameters) in which a transportation service should be scheduled/booked so that the user reaches the destination on time as per the learned daily schedule and ride scheduling parameters. The ride scheduling/booking may also be performed in a select range of time values or time window so that all the above ride scheduling parameters may be considered. Prior to scheduling the transportation service, a confirmation notification may be sent to the user so as to enable the user to confirm and/or reject the scheduling of the transportation service at that selected time. In one aspect, an optimal and desirable time period may be selected for scheduling the transportation service by taking into account user preferences, the learned daily schedule, and/or the ride scheduling parameters.

In one embodiment, the present invention may estimate the conditions and the manner for driving a user using the transport system by learning from a plurality of historical user data (e.g., past patterns of selected/preferred inside temperature (e.g., heating/cooling settings)), and/or a list of user-preferred radio channels, music preferences, preferred routes, and preferred characteristics of a type of transportation (e.g., a user may prefer a large sport utility vehicle ("SUV") for scheduled travel for out of town work assignments but a small compact car for daily commutes that have lower fares/surcharges). The present invention may dynamically select a first set of candidate vehicles for the user based on initial parameters. Furthermore, the present invention may take into consideration contextual factors based on a specific geographical location. For example, in some countries the status or social reputation of the user is judged by the type of vehicle the user is driving and/or driven in. Such context may significantly affect the user or the organization.

Therefore, the present invention may take into consideration such context when determining the most optimal booking for the user.

In yet another embodiment, the mechanisms of the illustrated embodiments may be configured with various analytics models to infer the user context. The user context may be analyzed based on analyzing previously asked questions (e.g., using an interactive communication system) on how the user prefers to be driven (e.g. how do you prefer the temperature/inside-air-condition, entertainment/media preferences, etc.). Analyzing the user context may also include determining the characteristics of the type of transportation (e.g., vehicles) based on analyzing the characteristics of the type of transportation (e.g., a ride/vehicle with more leg room, a ride/vehicle charging station). If desired, the user context (e.g., mood, cognitive states, etc.) may also be inferred from various mobile sensory data and user interaction data. In another embodiment, the user comfort level may be determined based on mobile data and user physical characteristics (e.g., height, weight, physical limitations, etc.) against the type of transportation in a user radius. The present invention may trigger the cognitive scheduling/booking process to optimize a first set of candidate vehicles based on the user context parameters.

For example, the user context may indicate that a battery of a mobile phone of the user is about to run out of battery power in the next 10 minutes. The estimated time of arrival ("ETA") of a potential ride sharing service may be estimated to arrive at the desired destination within the next 45 minutes. The present invention may learn that the user has a scheduled conference call in the next 20 minutes (10 minutes after the battery power of the mobile phone may expire). Accordingly, the present invention may optimize the selection of the ride sharing service by providing the transportation service having characteristics of an in-car charging station with quality ambient conditions (e.g., noise free ride) for the conference call. Also, based on estimated user current context (e.g., urgency level), the present invention may present all the transportation service options to a user in a graphical user interface ("GUI") along with a ranked order of the transportation services based on user preferences, context of the user and/or event, ride sharing parameters, the confidence level, and/or a variety of other selected factors used for selecting the transportation service(s).

Figure 4:
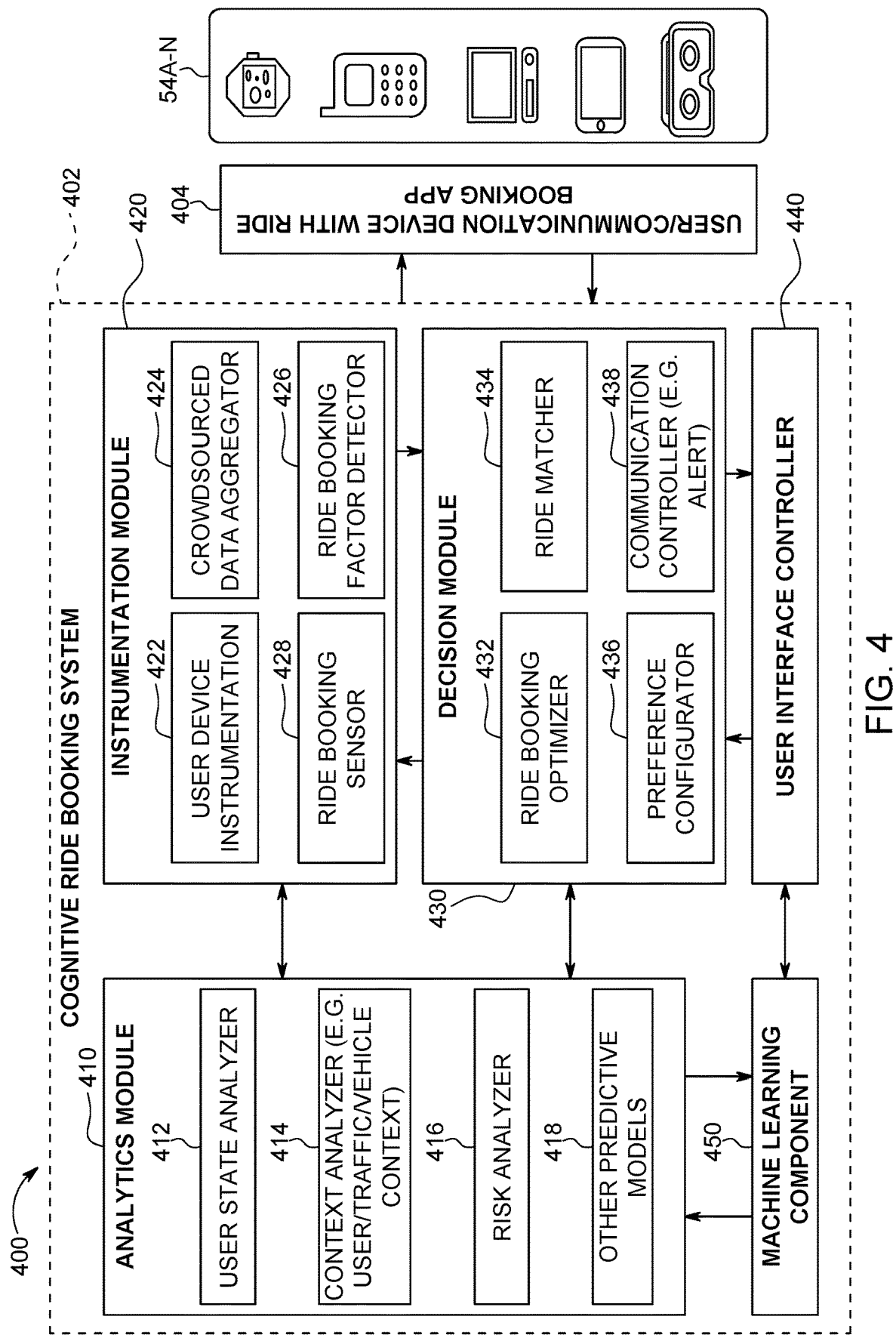
FIG. 4 is a diagram depicting various user hardware and computing components functioning in accordance with aspects of the present invention.

Turning now to FIG. 4, a block diagram depicting exemplary functional components 400 according to various mechanisms of the illustrated embodiments is shown. FIG. 4 illustrates facilitating ride scheduling based on scheduling parameters and user preferences in a computing environment, such as a cognitive ride booking system 402 that may be included in a computing environment, according to an example of the present technology. As will be seen, many of the functional blocks may also be considered "modules" or "components" of functionality, in the same descriptive sense as has been previously described in FIGS. 1-3. For example, computer system/server 12 of FIG. 1 may be included in FIG. 4 and may be connected to other computing nodes (such as computer systems of vehicles or non-vehicle systems such as traffic cameras, cloud computing networks, global positioning satellite ("GPS") devices, smartphones, etc.), and/or one or more Internet of Things (IoT) devices over a distributed computing network, where additional data collection, processing, analytics, and other functionality may be realized. The computer system/server 12 of FIG. 1, may include functional components 400 of the cognitive ride booking system 402 in order to collect, analyze, and process text data, images, video data, audio data, sensor data, or a combination thereof collected from the various computing devices and/or sensors. With the foregoing in mind, the module/component blocks 400 may also be incorporated into various hardware and software components of a system for facilitating ride scheduling based on scheduling parameters and user preferences in accordance with the present invention. Many of the functional blocks 400 may execute as background processes on various components, either in distributed computing components, or on the user device, or elsewhere.

The system 400 may include the computing environment such as, for example, a cognitive ride booking system 402 (e.g., a cognitive ride scheduling system), user equipment(s) ("UE") 404 (e.g., one or more communication devices having a ride scheduling application installed thereon), such as a desktop computer, laptop computer, tablet, wireless communication device (e.g., a smartphone), vehicular communication system, or on-board navigation system, and/or another electronic device that may have one or more processors and memory (e.g., computing devices 54A-N as described in FIG. 2). The cognitive ride booking system 402 and the UEs 404 may each be associated with and/or in communication with each other by one or more communication methods, such as a computing network.

In one aspect, the cognitive ride booking system 402 may be included in a computing system that provides virtualized computing services (i.e., virtualized computing, virtualized storage, virtualized networking, etc.) to UEs 404. More specifically, the cognitive ride booking system 402 may be included in a computing system that provides virtualized computing, virtualized storage, virtualized networking and other virtualized services that are executing on a hardware substrate.

As depicted in FIG. 4, the cognitive ride booking system 402 may include an analytics module 410, an instrumentation module 420, a decision module 430, a user interface ("UI") controller 440, and/or a machine learning component 450. The analytics module 410 may include a user state analyzer 412 to analyze the state of a user, a context analyzer 414 to analyze the context of the user, traffic, a vehicle, an event, and other transportation related services or products, a risk analyzer 416 to analyze the risk of a ride scheduling model, and one or more predictive models 418 to predict one or more models such as, for example, one or more ride scheduling models.

The instrumentation module 420 may include a user device instrumentation 422 to collect, receive, or provide user data, a crowd source data aggregator 424 to collect and/or aggregate data relating to a crowd source data (e.g., "crowdsourcing"), a ride booking factor detector 426 to identify and detect ride booking parameters/factors, and a ride booking sensor 428 to collect, gather, sense, or retrieve data relating to scheduling or booking a ride for a user.

The decision module 430 may include a ride booking optimizer 432 to optimize or rank each of the one or more ride scheduling models, a ride matcher 434 to match a user with one or more of the one or more ride scheduling models (e.g., match a user with a mode of transportation according to the ride scheduling models and parameters), a communication controller 438 to issue and/or provide one or more communication messages to a user (e.g., provide an alert or notification), and/or a preference configurator 436 to configure one or more ride scheduling models or parameters.

The UI controller 440 may be used to provide access to the cognitive ride booking system 402 for each one of the UEs 404.

The machine learning component 450 may collect and/or learn one or more user preferences, ride sharing parameters, one or more events, activities of daily living (ADL), and/or other events associated with a user.

One or more machine learning modules may be developed, learned, and/or built for providing one or more functions of the cognitive ride booking system. For example, the machine learning component 450 may apply multiple combinations of factors, parameters, user preferences, ADLs of the user, behavior characteristics, vehicle operator profiles, vehicle operation or behavior standards/values, learned behavior parameter data, temperature data, historical data, traffic data, weather data, road conditions, a health state of the operator, biometric data of the operator, longitudinal position data, latitudinal position data, longitudinal/latitudinal position data of one or more alternative vehicles in relation to the vehicle, or a combination thereof to the machine learning model for cognitive ride booking operations.

For example, the machine learning module 450 may cognitively predict and/or cognitively estimate an event associated with one or more identified and learned ride sharing parameters learned from one or more sensors associated with the ride booking sensor 428. In one aspect, the machine learning component 450 may assume that the behavior parameters are static given a particular context. Learning the behavioral patterns may include using online static parameter identification (e.g., online parameter estimation in general state-space models).

In one aspect, the machine learning component 450 may collect feedback information from the one or more sensors associated with the ride booking sensor 428 to learn, identify, and/or predict one or more ride sharing parameters, user preferences, and/or events (documented and/or undocumented) relating to a user for scheduling a ride sharing service using the cognitive ride booking system 402.

In one aspect, the machine learning modeling, as described herein, may be performed using a wide variety of methods or combinations of methods, such as supervised learning (e.g., MCMC filters, Kalman filters, particle filters, etc.), unsupervised learning, temporal difference learning, reinforcement learning and so forth. That is, the machine learning modeling may learn parameters of one or more physical models. The machine learning modeling may be employed in the category of parameter estimation of state-space models, which may be completed by unsupervised learning techniques, particularly to learn the context and/or the indicators.

Some non-limiting examples of supervised learning which may be used with the present technology include Kalman filters, particle filters, MCM filters, AODE (averaged one-dependence estimators), artificial neural network, backpropagation, Bayesian statistics, naive bays classifier, Bayesian network, Bayesian knowledge base, case-based reasoning, decision trees, inductive logic programming, Gaussian process regression, gene expression programming, group method of data handling (GMDH), learning automata, learning vector quantization, minimum message length (decision trees, decision graphs, etc.), lazy learning, instance-based learning, nearest neighbor algorithm, analogical modeling, probably approximately correct (PAC) learning, ripple down rules, a knowledge acquisition methodology, symbolic machine learning algorithms, sub symbolic machine learning algorithms, support vector machines, random forests, ensembles of classifiers, bootstrap aggregating (bagging), boosting (meta-algorithm), ordinal classification, regression analysis, information fuzzy networks (IFN), statistical classification, linear classifiers, fisher's linear discriminant, logistic regression, perceptron, support vector machines, quadratic classifiers, k-nearest neighbor, hidden Markov models and boosting. Some non-limiting examples of unsupervised learning which may be used with the present technology include artificial neural network, data clustering, expectation-maximization, self-organizing map, radial basis function network, vector quantization, generative topographic map, information bottleneck method, IBSEAD (distributed autonomous entity systems based interaction), association rule learning, apriori algorithm, eclat algorithm, FP-growth algorithm, hierarchical clustering, single-linkage clustering, conceptual clustering, partitional clustering, k-means algorithm, fuzzy clustering, and reinforcement learning. Some non-limiting example of temporal difference learning may include Q-learning and learning automata. Specific details regarding any of the examples of supervised, unsupervised, temporal difference or other machine learning described in this paragraph are known and are within the scope of this disclosure. Also, when deploying one or more machine learning models, a computing device may be first tested in a controlled environment before being deployed in a public setting. Also, even when deployed in a public environment (e.g., external to the controlled, testing environment), the computing devices may be monitored for compliance.

Additionally, the computing system 12/computing environment 402 may perform one or more calculations for facilitating ride scheduling according to mathematical operations or functions that may involve one or more mathematical operations (e.g., solving differential equations or partial differential equations analytically or computationally, using addition, subtraction, division, multiplication, standard deviations, means, averages, percentages, statistical modeling using statistical distributions, by finding minimums, maximums or similar thresholds for combined variables, etc.).

Figure 5:
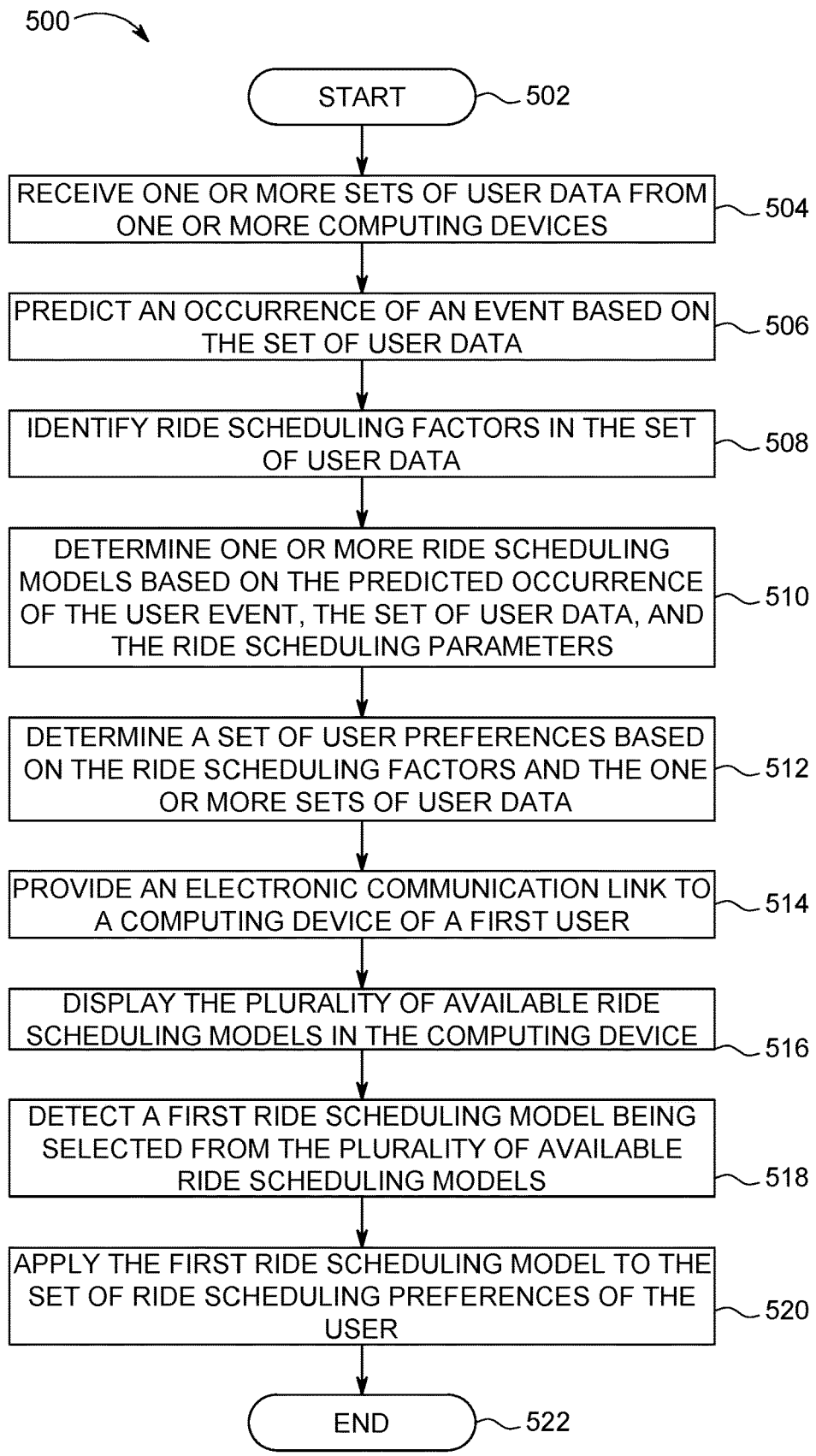
FIG. 5 is a flowchart diagram of an exemplary method for facilitating ride scheduling based on scheduling parameters and user preferences by a processor, in which various aspects of the present invention may be realized.

Turning now to FIG. 5, a method 500 for facilitating ride scheduling based on scheduling parameters and user preferences by a processor is depicted. In one aspect, the method 500 for facilitating ride scheduling based on scheduling parameters and user preferences may be incorporated into various hardware and software components described in FIGS. 1-4.

The functionality 500 may start in block 502. One or more sets of user data may be received from one or more computing devices, as in block 504. An occurrence of an event (e.g., a travel event) may be predicted based on the set of user data, as in block 506. Ride scheduling parameters (e.g., ride booking factors) may be identified in the set of user data, as in block 508. One or more ride scheduling models may be determined based on the predicted occurrence of the event, the set of user data, and the ride scheduling parameters, as in block 510. A set of user preferences may be determined based on the ride scheduling factors and the one or more sets of user data, as in block 512. An electronic communication link may be provided to the user to a computing device of a first user, as in block 514. The one or more available ride scheduling models may be displayed in the computing device (e.g., via an interactive graphical user interface "GUI" of the computing device as in block 516. A first ride scheduling model may be selected from the one or more available ride scheduling models, as in block 518. The first ride scheduling model may be applied to the set of preferences of the user, as in block 520. The functionality 500 may end, as in block 522.

In one aspect, in conjunction with and/or as part of at least one block of FIG. 5, the operations of 500 may include each of the following. The operations of 500 may determine the occurrence of an event, estimate a cognitive state of the user (e.g., tired, exhausted, emotional state) and/or context of the user (e.g., a user needs to be in a location X in 30 minutes) based on time matching with respect to one or more commuters sharing a ride and common or distinct destinations along the path based on said estimation, and/or facilitate the scheduling/booking of an optimal vehicle (e.g., ride sharing service having characteristics most closely matching parameters, user preferences, and context of the user) for the user via a cognitive ride booking system. The cognitive state of the user may include a state of fatigue, feelings of exhaustion, a level of distraction, preferred-to-be-driven preferences (e.g., temperature or inside-air-condition, specific radio channel, specific music preference, etc.), etc.

A user event may be undocumented or documented schedules (e.g., scheduled meetings, conference calls, lunch appointments, etc.), commitments, personalized tasks/goals, or other events that can be learned (e.g. using NLP) from a plurality of user data (e.g., historical user profile, sensory data, electronic calendar, travel history, etc.). The user context may be analyzed based on analyzing previously asked questions, interactions of the user with a driver or self-driven vehicle (SDV) on how the user prefers to be driven (e.g., questions and/or communication interactions relating to preferences for the temperature/inside-air-condition, entertainment/media preferences, and the like), etc. The user context may be also analyzed to determine the characteristics of transportation service based on analyzing the ride/vehicle characteristics.

Additionally, the operations of 500 may learn and/or estimate undocumented schedules or commitments from the user's situational context such as, for example, interactions or conversations with one or more users at a particular time of the day and/or location, and/or analyzing communication messages, notifications, social media postings, emails received/sent, and/or telephone calls. The operations of 500 may determine a risk for a predicted or learned event from a plurality of user data (e.g., historical user profile, sensory data, electronic calendar, travel history, etc.) or other (un)documented commitments. A list of matching commuters may be determined along the desired, selected, or identified route (e.g., commuters with whom the user may be known to share the ride sharing service) and the ride may be scheduled/booked taking the destination time and routine/monitored pattern of every user sharing the ride. Based on the estimated user current context (e.g., urgency level), the operations of 500 may provide all the options to the user in a GUI along with various decision factors.

Figure 6:
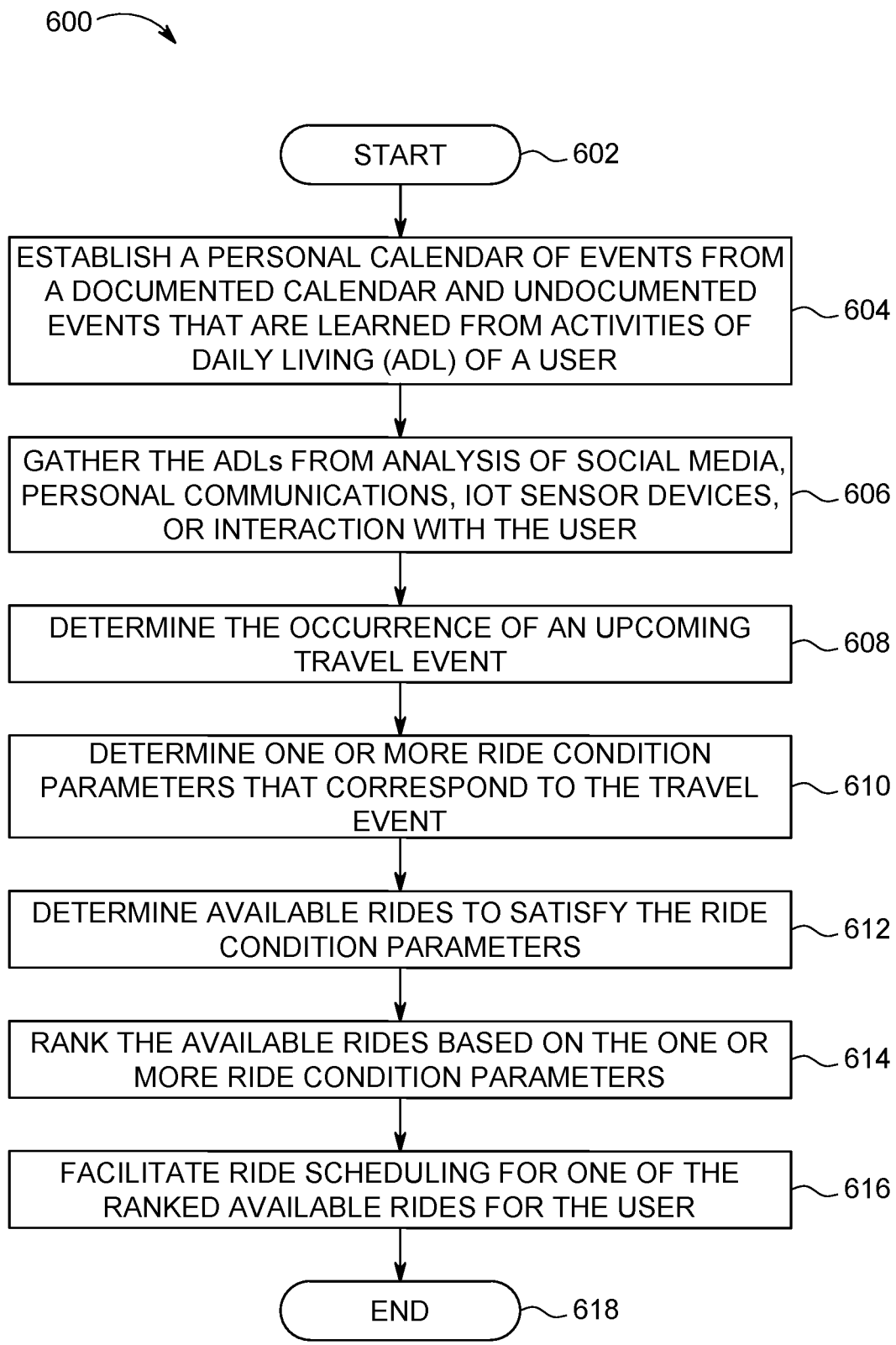
FIG. 6 is a flowchart diagram of an additional exemplary method for facilitating ride scheduling based on scheduling parameters and user preferences by a processor, in which various aspects of the present invention may be realized.

Turning now to FIG. 6, a method 600 for facilitating ride scheduling based on scheduling parameters and user preferences by a processor is depicted, in which various aspects of the illustrated embodiments may be implemented. The functionality 600 may start in block 602. A personal calendar of events may be established from a documented calendar (e.g., online calendar in an electronic calendaring system) and undocumented events that are learned from activities of daily living (ADL) of a user, as in block 604. The ADLs (and other activities, behaviors, or patterns of conduct or communications) may be gathered and/or collected from analysis of one or more social media networks, personal communications (e.g., personal communication such as a telephone call, text message, email, etc.), IoT sensor devices (e.g., wearable IoT sensor devices), and/or interaction with the user (e.g., an interactive exchange of communication with the user and an IoT device/computer), as in block 606. An occurrence of an upcoming travel event may be predicted and/or determined, as in block 608. One or more ride condition parameters may be determined that correspond to the travel event, as in block 610. One or more available rides (e.g., modes of transportation such as a train, taxi, etc.) may be determined to satisfy the one or more ride condition parameters, as in block 612. The one or more available rides may be ranked based on the one or more ride condition parameters, as in block 614. Ride scheduling may be facilitated (including the scheduling of one or more rides) for one of the ranked available rides for the user, as in block 616. The functionality 600 may end, as in block 618.

Figure 7:
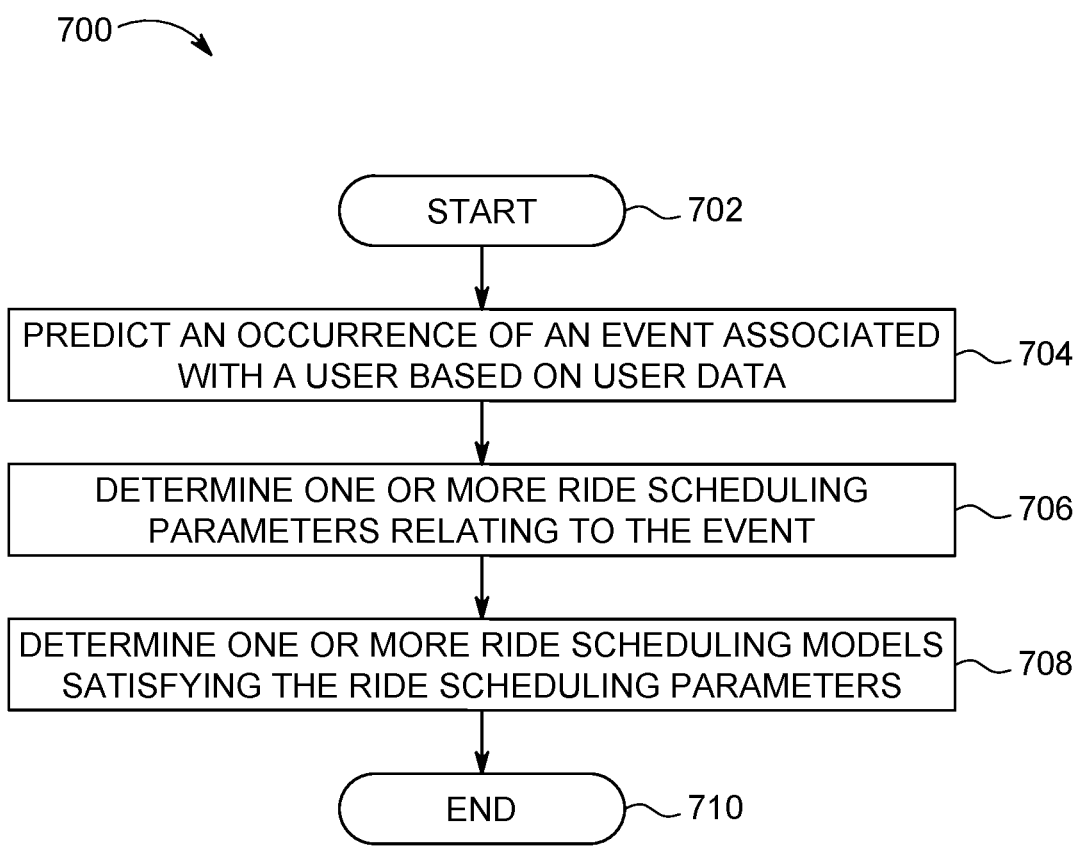
FIG. 7 is a flowchart diagram of an additional exemplary method for facilitating ride scheduling by a processor, in which various aspects of the present invention may be realized.

Turning now to FIG. 7, a method 700 for facilitating ride scheduling by a processor is depicted, in which various aspects of the illustrated embodiments may be implemented. The functionality 700 may start in block 702. An occurrence of an event associated with a user may be predicted based on user data, as in block 704. One or more ride scheduling parameters relating to the event may be determined, as in block 706. One or more ride scheduling models may be determined satisfying the ride scheduling parameters, as in block 708. A vehicle (e.g., a vehicle most suitable, appropriate, and/or preferred) may be scheduled for the user according to the ride scheduling models, as in block 710. The functionality 700 may end, as in block 712.

In one aspect, in conjunction with and/or as part of at least one block of FIG. 7, the operations of 700 may include each of the following. The operations of 700 may, pursuant to determining the one or more ride scheduling parameters, determine a cognitive state of the user. The cognitive state may include a fatigue level of the user, a level of distraction of the user, a subjective well-being (SWB) of the user, an emotional state of the user, one or more medical conditions, and/or a combination thereof.

The operations of 700 may, pursuant to determining the one or more ride scheduling parameters, collect the user data from a calendar, social media networks, one or more Internet of Things (IoT) sensor devices, wireless communication devices, or a combination thereof. Additionally, the operations of 700 may, pursuant to determining the one or more ride scheduling parameters, learn activities of daily living (ADL), user preferences, behavior patterns, biometric data, and a cognitive state of the user. The user preferences may include preferences for one or more modes of transportation, preferences for scheduling the one or more modes of transportation with alternative users, preferences of the one or more ride scheduling models, radio channel preferences, music preferences, temperature preferences, and/or a combination thereof of the user. In an additional aspect, the operations of 700 may, pursuant to determining the one or more ride scheduling parameters, learn one or more contextual factors relating to the user, the event, or a combination thereof. The one or more contextual factors may include traffic data, weather data, road conditions, time constraints of the user relating to the event, one or more alternative users using the one or more modes of transportation relating to the more ride scheduling models, location specific context (e.g., societal perception at a specific location or environment), risk levels of the more ride scheduling models, or a combination thereof.

The one or more ride scheduling models may be ranked according to the one or more ride scheduling parameters. Also, one or more modes of transportation may be scheduled relating to the more ride scheduling models based on the one or more ride scheduling parameters.

The operations of 700 may also collect feedback relating to the more ride scheduling parameters, and/or a machine learning mechanism to learn and modify one or more ride scheduling parameters and the one or more ride scheduling models.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowcharts and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowcharts and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowcharts and/or block diagram block or blocks.

The flowcharts and block diagrams in the Figures illustrate the architecture, functionality, and operation of possible implementations of systems, methods, and computer program products according to various embodiments of the present invention. In this regard, each block in the flowcharts or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, can be implemented by special purpose hardware-based systems that perform the specified functions or acts or carry out combinations of special purpose hardware and computer instructions.

The invention claimed is:

1. A method, by a processor, for facilitating ride scheduling, comprising:

executing machine learning logic, by the processor, to generate one or more ride scheduling models by a neural network trained using user data of a user; wherein generating the one or more ride scheduling models includes learning, by the neural network, activities of daily living (ADL) and historical patterns of the user inclusive of using global positioning satellite (GPS) data captured by a wireless communications device associated with the user to track current and historical locations visited by the user and transportation characteristics used by the user to arrive at the current and historical locations, the ADL and historical patterns including factors related to ride scheduling as explicitly specified by the user and factors implicitly related to the ride scheduling not specified by the user;

predicting, by the processor, an occurrence of an event associated with the user based on the ADL and historical patterns referenced in the user data according to the one or more ride scheduling models; wherein predicting the event includes predicting a destination location necessitating arrival by the user at a particular time and predicting sub-events of activities requiring specific hardware necessities to be performed by the user and that will occur during transportation of the user to the destination location;

determining, by the processor, one or more ride scheduling parameters relating to the event and the sub-events; wherein determining the one or more ride scheduling parameters includes determining the current location of the user according to the GPS data of the wireless communications device;

detecting, by the processor, an anomaly in the ADL or historical patterns of the user that will affect the event or the sub-events;

applying the determined one or more ride scheduling parameters to the neural network to generate, by the neural network using the processor, a ride scheduling model of the one or more ride scheduling models satisfying the ride scheduling parameters according to the detected anomaly; wherein the one or more ride scheduling models identify a mode of transportation, a type of vehicle, and characteristics of the vehicle which satisfy the ride scheduling parameters inclusive of characteristics which aid in providing the specific hardware necessities for the activities as contextually related to the anomaly;

automatically facilitating a scheduling of the vehicle for the user, by the processor, according to the ride scheduling model of the one or more ride scheduling models generated by the neural network via a presentation of the one or more ride scheduling models on a user interface associated with the wireless communications device; wherein the ride scheduling models are generated, at least in part, using a Mel-Frequency analysis to extract Mel-Frequency Cepstral Coefficients (MFCC) features of the ride scheduling models, and wherein the MFCC features of the ride scheduling models are used in combination with alternative factors to estimate a departure time at which the user needs to depart the current location in order to arrive at the destination location at the particular time to automatically facilitate the scheduling of the vehicle;

collecting feedback, by the processor, relating to the one or more ride scheduling parameters and the ride scheduling model; and executing the machine learning logic, by the processor, to automatically update the one or more ride scheduling models using the feedback as new input to the neural network, wherein updating the one or more ride scheduling models includes using the feedback correspondent to an outcome of a trip associated with the ride scheduling model to iteratively re-train the one or more ride scheduling models to increasingly optimize future scheduling of vehicles associated with future trips of the user over time.

2. The method of claim 1, wherein determining the one or more ride scheduling parameters further includes determining a cognitive state of the user, wherein the cognitive state includes a fatigue level of the user, a level of distraction of the user, a subjective well-being (SWB) of the user, an emotional state of the user, one or more medical conditions, or a combination thereof.

3. The method of claim 1, wherein determining the one or more ride scheduling parameters further includes collecting the user data from a calendar, social media networks, one or more Internet of Things (IoT) sensor devices, the wireless communication device, crowdsourcing, or a combination thereof.

4. The method of claim 1, wherein determining the one or more ride scheduling parameters further includes:

learning user preferences, biometric data, and a cognitive state of the user, wherein the user preferences include preferences for one or more modes of transportation, preferences for scheduling the one or more modes of transportation with alternative users, preferences of the one or more ride scheduling models, radio channel preferences, music preferences, temperature preferences, a combination thereof of the user; and learning one or more contextual factors relating to the user, the event, location, or a combination thereof, wherein the one or more contextual factors include traffic data, weather data, road conditions, time constraints of the user relating to the event, one or more alternative users using the one or more modes of transportation relating to the more ride scheduling models, risk levels of the more ride scheduling models, or a combination thereof.

5. The method of claim 1, further including ranking the one or more ride scheduling models according to the one or more ride scheduling parameters.

6. The method of claim 1, further including scheduling one or more modes of transportation relating to the more ride scheduling models based on the one or more ride scheduling parameters.

7. A system for facilitating ride scheduling, comprising:
a processor; and
a memory storing executable instructions that when executed cause the processor to:
execute machine learning logic to generate one or more ride scheduling models by a neural network trained using user data of a user; wherein generating the one or more ride scheduling models includes learning, by the neural network, activities of daily living (ADL) and historical patterns of the user inclusive of using global positioning satellite (GPS) data captured by a wireless communications device associated with the user to track current and historical locations visited by the user and transportation characteristics used by the user to arrive at the current and historical locations, the ADL and historical patterns including factors related to ride scheduling as explicitly specified by the user and factors implicitly related to the ride scheduling not specified by the user;

predict an occurrence of an event associated with the user based on the ADL and historical patterns referenced in the user data according to the one or more ride scheduling models; wherein predicting the event includes predicting a destination location necessitating arrival by the user at a particular time and predicting sub-events of activities requiring specific hardware necessities to be performed by the user and that will occur during transportation of the user to the destination location;

determine one or more ride scheduling parameters relating to the event and the sub-events; wherein determining the one or more ride scheduling parameters includes determining the current location of the user according to the GPS data of the wireless communications device;

detect an anomaly in the ADL or historical patterns of the user that will affect the event or the sub-events;

apply the determined one or more ride scheduling parameters to the neural network to generate a ride scheduling model of the one or more ride scheduling models satisfying the ride scheduling parameters according to the detected anomaly; wherein the one or more ride scheduling models identify a mode of transportation, a type of vehicle, and characteristics of the vehicle which satisfy the ride scheduling parameters inclusive of characteristics which aid in providing the specific hardware necessities for the activities as contextually related to the anomaly;

automatically facilitate a scheduling of the vehicle for the user according to the ride scheduling model of the one or more ride scheduling models generated by the neural network via a presentation of the one or more ride scheduling models on a user interface associated with the wireless communications device; wherein the ride scheduling models are generated, at least in part, using a Mel-Frequency analysis to extract Mel-Frequency Cepstral Coefficients (MFCC) features of the ride scheduling models, and wherein the MFCC features of the ride scheduling models are used in combination with alternative factors to estimate a departure time at which the user needs to depart the current location in order to arrive at the destination location at the particular time to automatically facilitate the scheduling of the vehicle;

collect feedback relating to the one or more ride scheduling parameters and the ride scheduling model; and execute the machine learning logic, by the processor, to automatically update the one or more ride scheduling models using the feedback as new input to the neural network, wherein updating the one or more ride scheduling models includes using the feedback correspondent to an outcome of a trip associated with the ride scheduling model to iteratively re-train the one or more ride scheduling models to increasingly optimize future scheduling of vehicles associated with future trips of the user over time.

8. The system of claim 7, wherein the executable instructions, pursuant to determining the one or more ride scheduling parameters, further determine a cognitive state of the user, wherein the cognitive state includes a fatigue level of the user, a level of distraction of the user, a subjective well-being (SWB) of the user, an emotional state of the user, one or more medical conditions, or a combination thereof.

9. The system of claim 7, wherein the executable instructions, pursuant to determining the one or more ride scheduling parameters, further collect the user data from a calendar, social media networks, one or more Internet of Things (IoT) sensor devices, the wireless communication device, crowdsourcing, or a combination thereof.

10. The system of claim 7, wherein the executable instructions, pursuant to determining the one or more ride scheduling parameters, further:

learn user preferences, biometric data, and a cognitive state of the user, wherein the user preferences include preferences for one or more modes of transportation, preferences for scheduling the one or more modes of transportation with alternative users, preferences of the one or more ride scheduling models, radio channel preferences, music preferences, temperature preferences, a combination thereof of the user; and learn one or more contextual factors relating to the user, the event, or a combination thereof, wherein the one or more contextual factors include traffic data, weather data, road conditions, time constraints of the user relating to the event, location, one or more alternative users using the one or more modes of transportation relating to the more ride scheduling models, risk levels of the more ride scheduling models, or a combination thereof.

11. The system of claim 7, wherein the executable instructions further rank the one or more ride scheduling models according to the one or more ride scheduling parameters.

12. The system of claim 7, wherein the executable instructions further schedule one or more modes of transportation relating to the more ride scheduling models based on the one or more ride scheduling parameters.

13. A computer program product for facilitating ride scheduling by a processor, the computer program product comprising a non-transitory computer-readable storage medium having computer-readable program code portions stored therein, the computer-readable program code portions comprising:

an executable portion that executes machine learning logic to generate, by the processor, one or more ride scheduling models by a neural network trained using user data of a user; wherein generating the one or more ride scheduling models includes learning, by the neural network, activities of daily living (ADL) and historical patterns of the user inclusive of using global positioning satellite (GPS) data captured by a wireless communications device associated with the user to track current and historical locations visited by the user and transportation characteristics used by the user to arrive at the current and historical locations, the ADL and historical patterns including factors related to ride scheduling as explicitly specified by the user and factors implicitly related to the ride scheduling not specified by the user;

an executable portion that predicts, by the processor, an occurrence of an event associated with the user based on the ADL and historical patterns referenced in the user data according to the one or more ride scheduling models; wherein predicting the event includes predicting a destination location necessitating arrival by the user at a particular time and predicting sub-events of activities requiring specific hardware necessities to be performed by the user and that will occur during transportation of the user to the destination location;

an executable portion that determines, by the processor, one or more ride scheduling parameters relating to the event and the sub-events; wherein determining the one or more ride scheduling parameters includes determining the current location of the user according to the GPS data of the wireless communications device;

an executable portion that detects, by the processor, an anomaly in the ADL or historical patterns of the user that will affect the event or the sub-events;

an executable portion that applies the determined one or more ride scheduling parameters to the neural network to generate, by the neural network using the processor, a ride scheduling model of the one or more ride scheduling models satisfying the ride scheduling parameters according to the detected anomaly; wherein the one or more ride scheduling models identify a mode of transportation, a type of vehicle, and characteristics of the vehicle which satisfy the ride scheduling parameters inclusive of characteristics which aid in providing the specific hardware necessities for the activities as contextually related to the anomaly;

an executable portion that automatically facilitates a scheduling of the vehicle for the user, by the processor, according to the ride scheduling model of the one or more ride scheduling models generated by the neural network via a presentation of the one or more ride scheduling models on a user interface associated with the wireless communications device; wherein the ride scheduling models are generated, at least in part, using a Mel-Frequency analysis to extract Mel-Frequency Cepstral Coefficients (MFCC) features of the ride scheduling models, and wherein the MFCC features of the ride scheduling models are used in combination with alternative factors to estimate a departure time at which the user needs to depart the current location in order to arrive at the destination location at the particular time to automatically facilitate the scheduling of the vehicle;

an executable portion that collects feedback, by the processor, relating to the one or more ride scheduling parameters and the ride scheduling model; and an executable portion that executes the machine learning logic, by the processor, to automatically update the one or more ride scheduling models using the feedback as new input to the neural network, wherein updating the one or more ride scheduling models includes using the feedback correspondent to an outcome of a trip associated with the ride scheduling model to iteratively re-train the one or more ride scheduling models to increasingly optimize future scheduling of vehicles associated with future trips of the user over time.

14. The computer program product of claim 13, wherein the executable portion, pursuant to determining the one or more ride scheduling parameters, further collects the user data from a calendar, social media networks, one or more Internet of Things (IoT) sensor devices, the wireless communication device, crowdsourcing, or a combination thereof.

15. The computer program product of claim 13, wherein the executable portion, pursuant to determining the one or more ride scheduling parameters, further:

learns user preferences, biometric data, and a cognitive state of the user, wherein the user preferences include preferences for one or more modes of transportation, preferences for scheduling the one or more modes of transportation with alternative users, preferences of the one or more ride scheduling models, radio channel preferences, music preferences, temperature preferences, a combination thereof of the user; and learns one or more contextual factors relating to the user, the event, or a combination thereof, wherein the one or more contextual factors include traffic data, weather data, road conditions, time constraints of the user relating to the event, one or more alternative users using the one or more modes of transportation relating to the more ride scheduling models, risk levels of the more ride scheduling models, or a combination thereof.

16. The computer program product of claim 13, further including an executable portion that ranks the one or more ride scheduling models according to the one or more ride scheduling parameters.

17. The computer program product of claim 13, further including an executable portion that schedules one or more modes of transportation relating to the more ride scheduling models based on the one or more ride scheduling parameters.

* * * * *